No Printed Specification Available
8586X
I. ADAMS.
MACHINE FOR BREAKING THE HUSKS OF COFFEE BERRIES.
Patented Jan. 13, 1835.
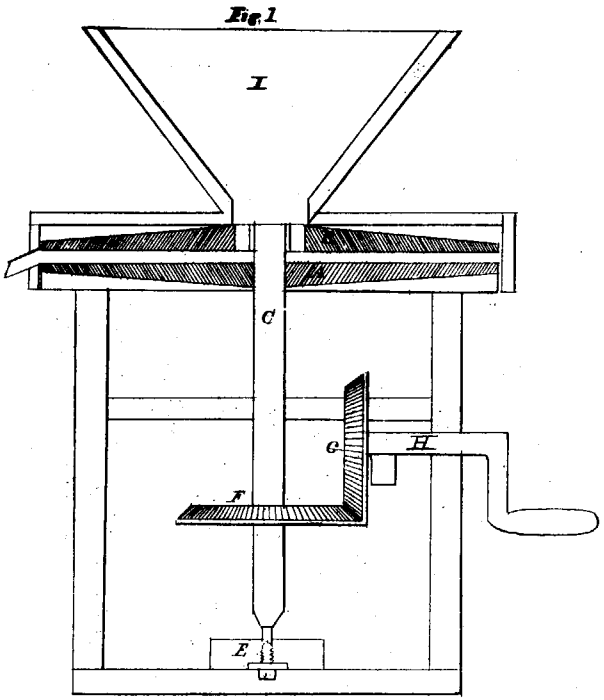
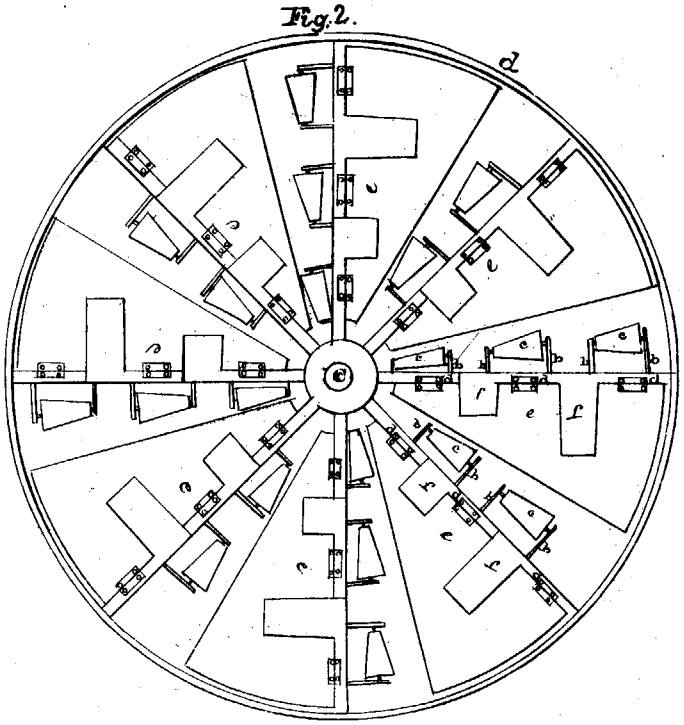
THE NORRIS PETERS CO., PHOTO-LITHO., WASHINGTON, D. C.

Jan. 13. 1835 8586X 345

Isaac Adams, of Boston. Mass:
Letters Patent

The schedule referred to in these Letters Patent, and making part of the same, containing a description in the words of the said Isaac Adams, himself of his improvement in machinery for breaking or cracking in pieces the husks of the coffee berry.

---

To all persons to whom these presents shall come, Isaac Adams of Boston, in the County of Suffolk, and State of Massachusetts - sends greeting. —

Be it known, that I the said Isaac Adams, have invented, made, and applied to use, new & useful improvements of machinery for bruising & breaking in pieces the husks of the coffee berry, which improvements I have fully sett forth & described in the following words, and drawings annexed, which taken together, form my specification. — —

Fig. 1. represents the machinery I have contemplated for the first mode of operation - which consists of a circular cast iron plate A, having suitable furrows or projecting teeth formed on its upper surface - and which is supported on a suitable frame-work of timber or cast iron, or other proper material, shaped as seen in the drawing or otherwise properly construct-ed, to answer the intended purpose of supporting the said plate and machinery connected to it - over the plate A, is a second plate B, whose under surface is furrowed or covered with suitable teeth similar to the plate A. Through the centre of the plate B, an upright shaft C, enters and is secured by wedges, or otherwise, to the plate B. The lower extremity of the shaft C, is supported and turns in a step or box attached to the horizontal part E. of the frame. F, is a beveled wheel on the shaft C, acted on and caused to turn round by a beveled wheel G, on the end of a horizontal shaft H, on whose other extremity is a handle, pulley or other convenience for giving motion to the said shaft H. —

The berries being put in the hopper I, pass downward between the plates A. B. and motion being given to the plate B, as it revolves, it cracks or breaks open the husks of the coffee, which are afterwards seperated from or seeds, by the process of winnowing. The upper plate B, may be raised above, or sett at any convenient distance from the lower plate A, by means of a screw acting on the bottom of the box or step in which the foot of the vertical shaft C, rests & turns.

The object of the above change in the distance of the plates from each other is to accommodate the machinery to operate on the different kinds of coffee - the berries being quite different as to size, in the different countries where produced — —

Instead of the grinding surfaces being circular planes, the lower A. may be crowned in the centre, or may be bell shaped, orslightly conical, or otherwise properly formed for the purpose, and the upper B. may be made concave, to correspond to any convexity of the lower plate, so as to facilitate the operation of breaking or cracking in pieces the husks from around the seeds. In my second construction of the apparatus, the frame work and the lower plate A, are in all respects similar to that first mentioned, but instead of an upper plate of iron as heretofore described, I connect to the top of the vertical shaft C (fig. 2.) the ends of a series of arms which radiate outward and terminate at their opposite extremities in a ring a, These arms may be of cast or wrought iron, or other suitable material. To each of the arms are attached the ends of springs of steel b.b.b. &c. (as seen in the drawing,) sett at proper distances asunder.

The holes are bored in the ends of the said springs into which the ends of small conic fluted rollers c.c.c.c, &c. are inserted. The rollers on one of the arms are sett at suitable distances from each other while those on the arm next contiguous are so placed as to be opposite the places between the rollers on the arm first mentioned, and so on throughout the series. By this arrangement every part of the surface of the lower plate A, is brought in contact with the surfaces of the small rollers during the revolution of the arms. On the opposite side of the arms on which are the springs b.b.b. &c. supporting the fluted rollers c.c.c, &c. I attach by means of hinges d.d.d.d. &c. plates e.e.e.e. &c. of cast iron or other proper material suitably formed or grooved on the under surface or having projecting teeth thereon, to be acted on and pressed downward by springs f.f.f.f. &c. The object of springs supporting the small rollers & plates e.e.e. &c. is, that when a berry of coffee is presented between the lower plate and one of the rollers, or plates e.e.e, the force tending to crush or crack the outer husk may be relieved by the springs so as not to break in pieces the seed or kernel of the coffee. The whole top and sides of the machine may be inclosed in a proper casing of wood or other suitable material and surmounted by a hopper. To the arms may be attached any convenient number of rollers, and the whole may be constructed of such suitable size, form, and material as shall best answer the intended purpose —.

What I claim is — The invention use of the lower plate or surface of cast iron or other suitable metal, with furrows or projecting teeth on it, shaped & formed in the different ways heretofore described — to operate with an upper plate or surface or series of arms,

85x86X 34 fluted rollers and plates, or any other machinery - which may be attached to it - -
And I also claim a series of radial arms, having attached to them a series of springs, plates,
and rollers, as above described - to be used in connection with a lower surface, as heretofore
mentioned - for the purpose of breaking or cracking the outer husks of the coffee berry. -
In testimony that the above is a true specification of my said invention & improve-
ments, I have hereunto sett my hand this eleventh day of December, in the year of our
Lord eighteen hundred and thirty-four.

Witnesses
Robt. H. Eddy
Thomas Ditson

Isaac Adams (Drawing)

1478 W.